(No Model.) 4 Sheets—Sheet 1.
H. V. HARTZ.
BRAKE MECHANISM FOR CARS.
No. 479,420. Patented July 26, 1892.
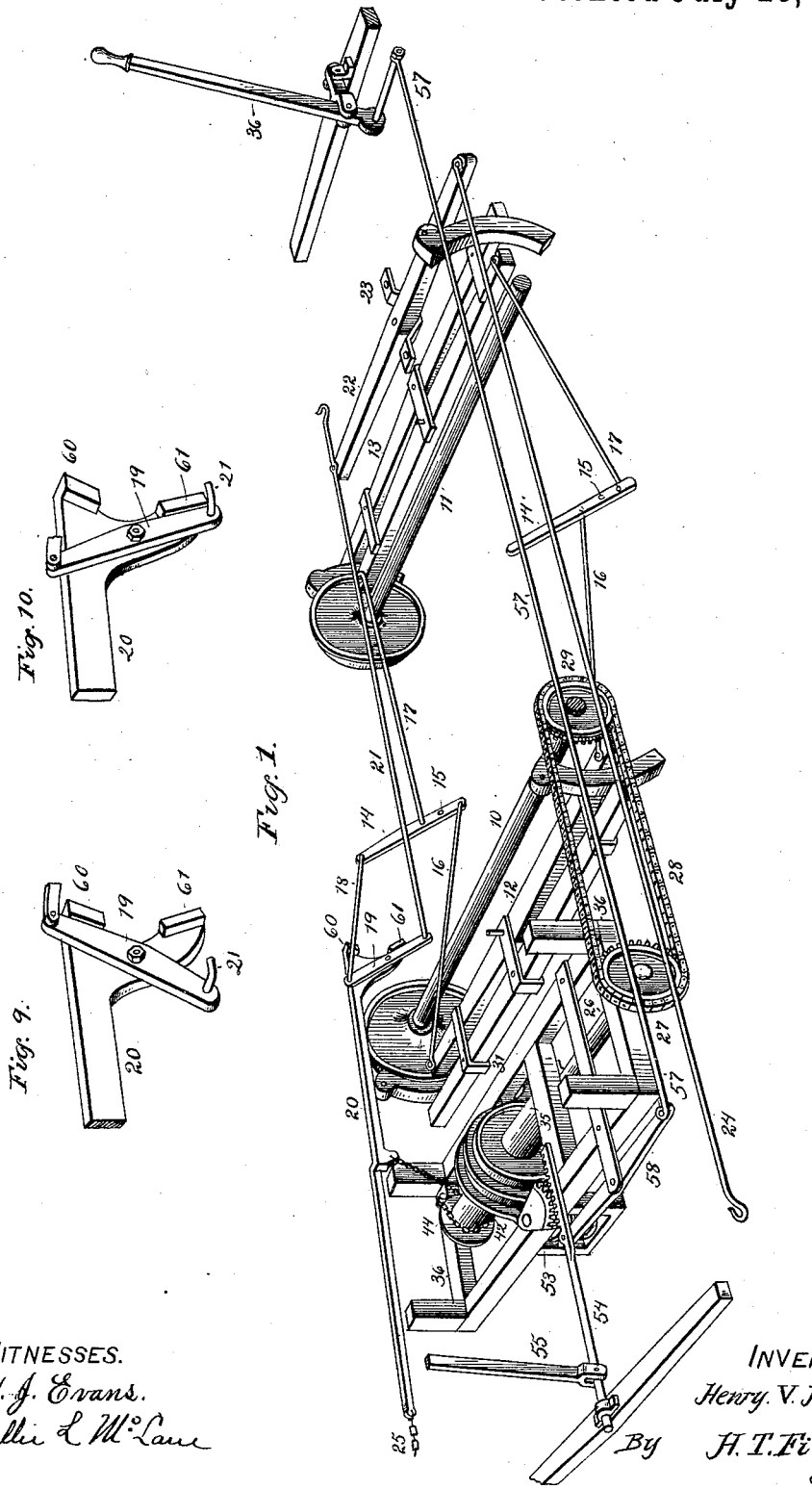
WITNESSES.
V. J. Evans.
Nellie L. McLane
INVENTOR.
Henry V. Hartz.
By H. T. Fisher.
Atty.
THE NORRIS PETERS CO., PHOTO-LITHO., WASHINGTON, D. C.

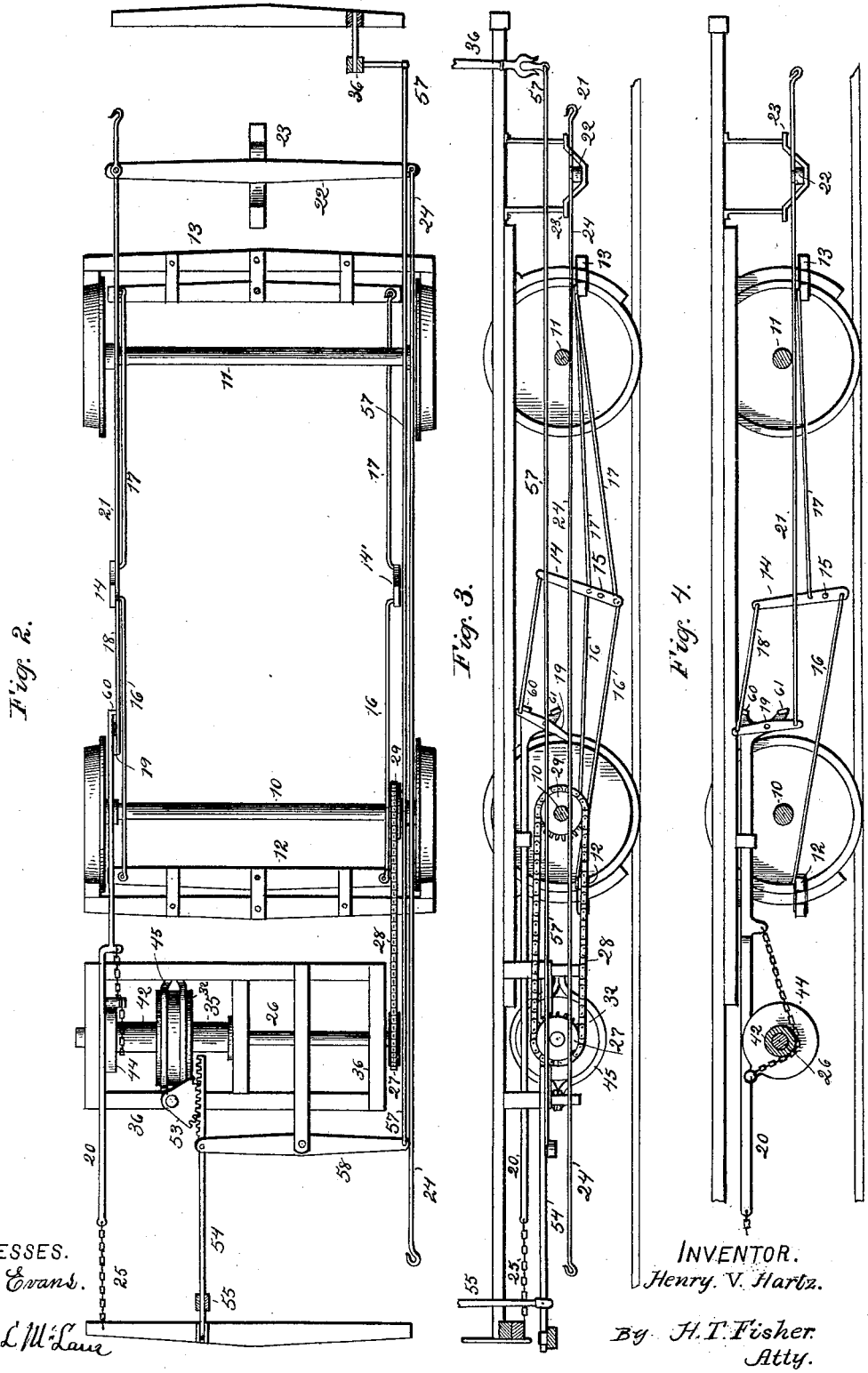

(No Model.) 4 Sheets—Sheet 3.
H. V. HARTZ.
BRAKE MECHANISM FOR CARS.

No. 479,420. Patented July 26, 1892.

WITNESSES.
V. J. Evans
Nellie L. McLane

INVENTOR.
Henry. V. Hartz.
By H. T. Fisher.
Atty.

(No Model.) 4 Sheets—Sheet 4.

H. V. HARTZ.
BRAKE MECHANISM FOR CARS.

No. 479,420. Patented July 26, 1892.

WITNESSES.
V. J. Evans.
Nellie L. McLane

INVENTOR.
Henry V. Hartz
By H. T. Fisher
Atty.

UNITED STATES PATENT OFFICE.

HENRY V. HARTZ, OF CLEVELAND, OHIO.

BRAKE MECHANISM FOR CARS.

SPECIFICATION forming part of Letters Patent No. 479,420, dated July 26, 1892.

Application filed August 25, 1891. Serial No. 403,651. (No model.)

*To all whom it may concern:*

Be it known that I, HENRY V. HARTZ, a citizen of the United States, residing at Cleveland, in the county of Cuyahoga and State of Ohio, have invented certain new and useful Improvements in Brake Mechanism for Cars on Street-Railways; and I do hereby declare that the following is a full, clear, and exact description of the invention, which will enable others skilled in the art to which it appertains to make and use the same.

My invention relates to improvements in brake mechanism for cars on street-railways, and the invention belongs to the class of brakes in which the momentum of the car is utilized for setting the brake. This new mechanism is designed to be supplemental to the hand-brake now commonly in use when such hand-brake is already on a car, as shown in the accompanying drawings; but if a car be unequipped with the hand-brake none need be added, and my improved brake will answer all purposes.

The invention also comprises an evener or its equivalent, by means of which the usual brake on one or more cars in the train, whether towed or pushed, can be simultaneously operated from the motor-car carrying my improvement.
The invention also comprises a device for the equalizing-lever which renders it unnecessary to use either a bolt or hook when the trail-car is detached.

To these ends the invention consists in the construction, substantially as shown and described, and particularly pointed out in the claims.

Figure 5:
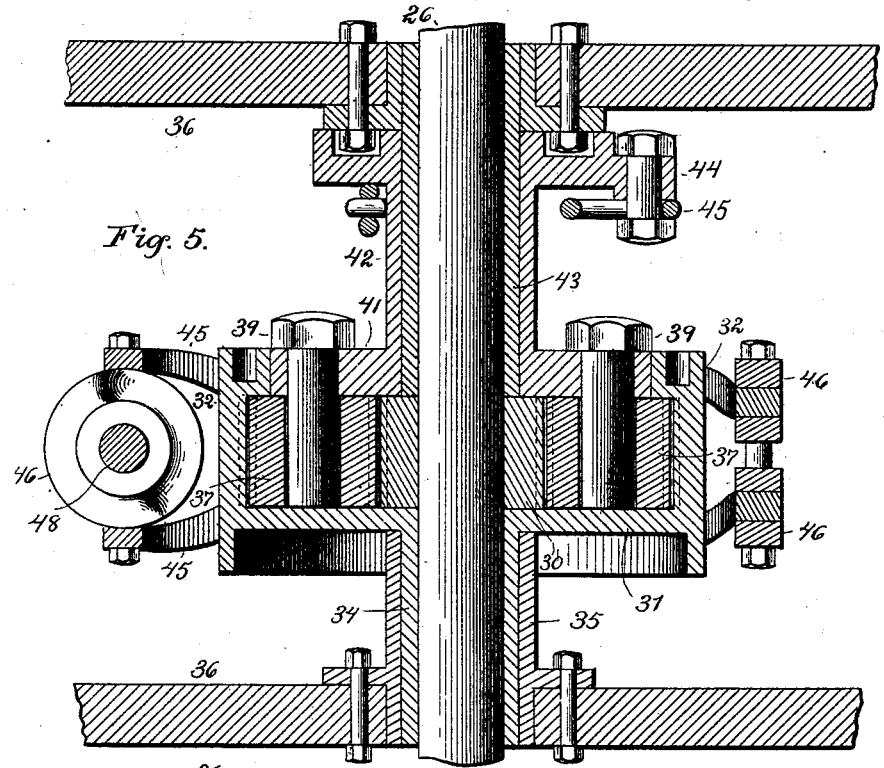
Figure 6:
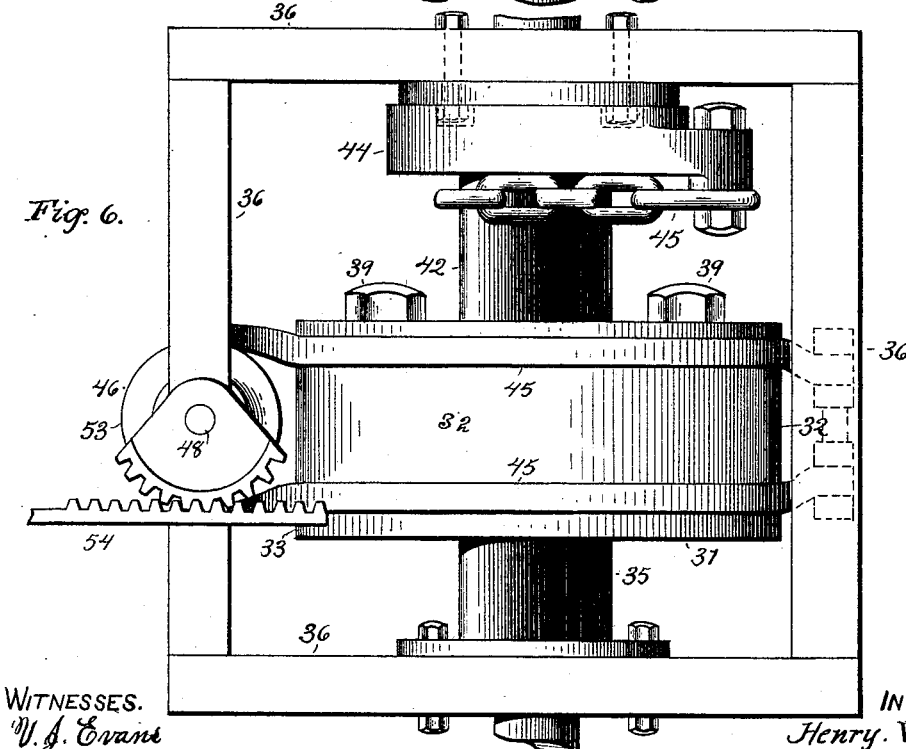
Figure 7:
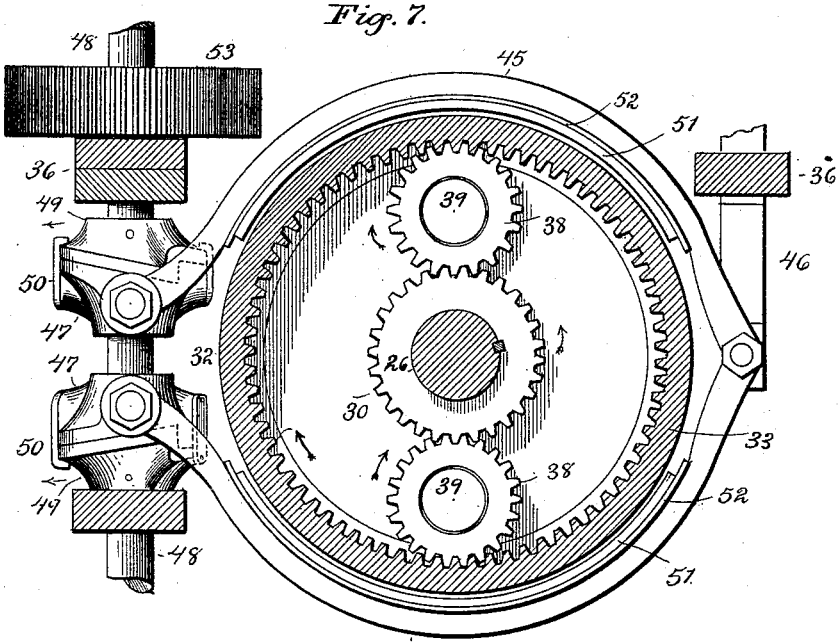
Figure 8:
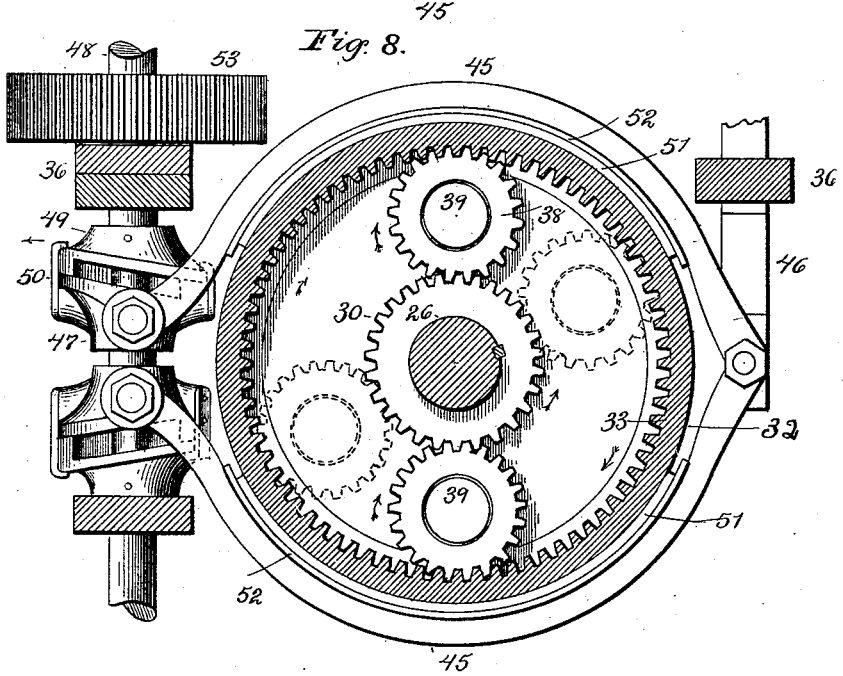

In the accompanying drawings, Figure 1 is a perspective view of a part of the truck of a car equipped with my improvement, and Fig. 2 is a plan view thereof. Fig. 3 is a side elevation of the car and mechanism shown in Fig. 1 with the wheels removed on one side of the car; and Fig. 4 is a sectional view taken on line *x x*, Fig. 1. Fig. 5, Sheet 3, is an enlarged central horizontal sectional view of the clutch mechanism on the shaft shown at the front of the car in Figs. 2, 3, and 4; and Fig. 6 is a plan view of said mechanism and part of the shaft and of the carrying-frame therefor. Fig. 7 is a cross-section, enlarged, on line *y y*, Fig. 2, showing the friction-clutch mechanism open; and Fig. 8 is a view of the same parts, showing them closed. The dotted lines of the small pinions show their probable position when carried around in the act of tightening the mechanism on the drum, all as hereinafter more fully described. Fig. 9 is an enlarged detail of the evener and its support, and showing the evener as it hangs normally when the brake-bars are out of locking engagement. Fig. 10 is a view of the same parts, as in Fig. 9, showing the evener in locking position.

In the drawings, 10 is what for convenience of this description will be termed the "front" axle, and 11 the "rear" axle, and 12 and 13 are the brake-bars.

As already stated, my improvement is shown here as in part supplemental to the common hand-brake mechanism and incorporated therewith. Hence if for any reason the brake fails to operate through the friction-clutch it can be operated from the old hand-wheel, as will appear from the further description herein.

Referring now to the details of the brake mechanism, it will be seen that midway of the center of the truck at one side there are two levers 14 and 14′, pivoted at 15 below their centers, and having rods 16 and 17 above and below their pivot-points connected with and serving to operate the brake-bars 12 and 13. A rod 18 connects lever 14 with the upper end of the evener 19, which is pivoted at its center at the end of the longitudinally-sliding draw-bar 20, supported in suitable keepers or guides on the truck-frame. The opposite or lower end of evener 19 is connected by a rod 21 with the end of a horizontal lever 22, pivoted centrally in a hanger 23 at the rear end of the "car," so called. Connection is made with the brake mechanism of the other car or cars in the train, which for the time may be coupled up with this end of the motor-car through the hook on the said rod 21 or through its equivalent on the end of lever 22. If the car or cars be at the other end of the motor-car, connection with the brake mechanism thereon is made through the rod 24, running from the opposite end of lever 22.

It will of course be understood that my improved brake mechanism is employed only in one car, and that the brakes on the other cars, whatever styles they may be, but presumably the old style of hand-brake, are operated and set from this improved mechanism on the motor-car.

The common hand-wheel connection is made with draw-bar 20 through chain 25 at its front end, and it is obvious from the description of the parts hereinbefore mentioned that the brakes could be set by turning this hand-wheel as usual. Now in order that the breaking may be more easily and effectually done by utilizing the momentum of the car, instead of the hand-power of the motor-man, I connect certain other parts with the draw-bar 20, as will now appear.

Referring to Figs. 1 and 2 for a view of arrangement, it will be seen that I employ a shaft 26, supported in bearings in a suitable frame at the front of the car before the front axle and carrying a sprocket-wheel 27, connected by sprocket-chain 28 with a sprocket-wheel 29 on the car-axle 10. This of course will cause shaft 26 to turn constantly with the car-axle.

Referring now to Figs. 7 and 8, where the parts are enlarged, it will be seen that a large pinion 30 is splined on shaft 26 to turn therewith. This pinion is inclosed by a housing consisting, primarily, of two parts: first, a casing 31, which has a smooth annular band-like exterior 32, Fig. 6, and, second, an internal gear 33. A hub or sleeve 34, integral with the casing and around but loose or free from shaft 26, is supported by a bush or tube 35, bolted through its flanges firmly to the supplemental frame 36, so as to take the weight of said casing from the constantly-revolving shaft 26. This casing is geared to revolve in the opposite direction from shaft 26 when said shaft is in motion, and is supported in its bushing or tube 35, as stated; but when braking occurs it is caused to stand still, as will now appear.

In Figs. 7 and 8 are plainly shown two pinions 37 and 38, and also in Fig. 5. These pinions mesh with the central pinion 30 and are journaled on suitable pins or studs 39, supported on the side disk 40. This disk 40 forms one side of the casing 31 for the several pinions, which, for economical reasons, should be tightly inclosed to exclude dust and dirt. Hence the disk 40 fits closely in the inwardly-extending edge 41 of the casing 31, which edge 41 has a depth of two inches, more or less, to form a receptacle to contain oil for lubricating the said pinions. Integral with the disk 40 is a drum 42, which runs on a suitable bushing 43, firmly secured to the supplemental frame 36, and serves to support said drum and disk and the pinions 38 thereon from resting their weight on the shaft 26 to prevent friction on said shaft. As here shown, the outer end of the sleeve-shaped drum 42 has a projecting portion 44, which may be of the nature of an arm or the like, to which is attached the chain 45 or its equivalent, which is connected at its opposite end to the draw-bar 20 and serves to draw said bar when braking occurs. Now remembering that shaft 26 and the pinions operated thereby are continually running when the car is in motion and that the casing having the smooth band-surface 32 is turning at the same time in the opposite direction, the disk 41 and drum 42 standing still the meantime, I take off the power thus transmitted from the axle by means of frictional contact with the said friction band-surface or band 32. This contact is made by means of friction-clutch mechanism consisting, first, of two band-like sections or clamps 45, pivoted at one end on a bracket 46 on the supplemental frame 36, and pivoted at their opposite ends each separately to a cam 47. The said clamps or band-sections extend one around the top and the other around the bottom of the outer friction-surface of the internal gear, which I term the "friction-band," and together they cover about two-thirds the surface of said band, more or less. The cams 47 fit loosely on a short vertically-arranged shaft 48, supported in frame 36, and are arranged between two other cams 49, fixed rigidly upon the said shaft 48. The incline of one of these cams 49 runs to the right and the other to the left or reversely to each other, and corresponding or matching faces are formed on the cams 47. Fixed to the cams 47 are fingers or straps 50, which overreach and engage flanges on cams 49, so as to make the action of the cams positive. It follows that when the shaft 48 is turned in one direction it will move the intermediate cams 47 toward one another by the action of the cams 49 against the faces thereof and thus tighten clamps 45 on the band 32, and that when the said shaft 48 is turned in the opposite direction it will loosen the said clamps by carrying the cams 47 apart, as seen in Fig. 8.

The clamps 45 are preferably lined with leather or its equivalent 51 to sustain the wear and to afford a better frictional engagement than an iron or like hard surface would give, and this leather is laid on a metal strip 52, which comes next to the clamps. Any convenient way of affixing the leather may be adopted. To operate or rotate the shaft 48, I employ a geared segment 53, fixed to its upper end, and this segment is in turn engaged by a rack-bar operated by the hand-lever 55 under control of the motor-man. A slight rotation of shaft 48 serves the purpose. This operates the brake mechanism from the front of the car. To operate said mechanism from the rear or opposite end, the hand-lever 56 is connected by a long rod 57, or its equivalent, to a horizontally-arranged lever 58 at the front of the car, which is pivoted at its center and attached at its opposite end to the rack-bar 54. By this means the said rack-bar and the mechanism operated thereby are conveniently operated from either end of the car.

At its inner end the draw-bar 20 has a depending arm or downward extension, to which the evener 19 is pivoted, and behind this pivot-point and above and below the same are two lateral stops 60 and 61 for the said evener. In its normal position the said evener is inclined—say as seen in Figs. 3 and 9—in which case it rests against stop 60. When draft is made on the draw-bar in setting the brake, said evener swings toward the position shown in Figs. 4 and 10 and into a substantially vertical position. Then in case the trail-car should be removed the evener will rest against the stop 60 and the draw-bar will operate the brakes on the motor only without movement of said evener, and if the brakes on the motor-car should happen to get disarranged or the connection broken the evener will swing and rest against stop 61 and the draw-bar will operate on the trail-car only, thus preventing direct accident for the time being. If the motor-car alone were used, the evener would not be needed and the rod 18 could be attached directly to the draw-bar.

The operation of the brake will be apparent from the foregoing description. Assuming that the car is under headway and the brake is to be applied, the motor-man has simply to bear gently against the hand-lever 55 or 56, according to the end of the car he is occupying. This will cause vertical shaft 48 to be rotated through the action of the rack-bar 54 and segment 53 and the two cams 47 to move toward one another and gradually tighten the clamps 45 on the band 32, having the internal gear 33. As this occurs the rotation of said gear will be gradually but effectually stopped, and as the car is still in motion and the shaft 26 and its pinion 30 continue to rotate the pinions 37 and 38 must also rotate with them. But since the internal gear 33 is held fast by the clamps from turning, the pinions 37 and 38 can do nothing more than travel around in said gear a greater or less distance—say, to the position shown in dotted lines in Fig. 8. In this case the said gear 33 serves as a rack in which the pinions are forced to travel, and by traveling to turn the disk 40, in which they are journaled, and the drum 42 and its draw-arm 44. This in turn causes chain 45 to wind on drum 42 and to pull on the draw-bar 20 through which the brake mechanism is operated and the brake-shoes forced against the wheels. The operator has nothing to do with the braking but to tighten the friction-clamps on the surface of the friction-band 32, which is easily and quickly done, and then the momentum of the car does the balance of the work.

It will be understood that I do not limit my invention to the common form of brake mechanism partly illustrated in connection with my invention, as this mechanism may be considerably altered or changed and still serve my purpose. My invention, in fact, comprises any suitable means of applying the power after the same has been economized and made available through the draw-bar. If the braking be from the front of the car, the brakes in the trail-car will be set through the rod 21 directly, and if from the other end of the car the brakes in the train will be set through the rod 21, lever 22, and rod 24, as before described.

I prefer sprocket-wheel connections between the counter-shaft 26 and the car-axle, but their mechanical equivalent, as gear, may be used.

In using the term "winding-drum," as herein, I mean a drum proper or its equivalent for causing a pull on the chain 45 to move the draw-bar in the manner described. The drum in this case is a tube of comparatively small diameter and may be made of any suitable size.

Having thus described my invention, what I claim as new, and desire to secure by Letters Patent, is—

1. In car-brake mechanism, a counter-shaft driven from the car-axle and a pinion fixed thereon, a friction-band having internal gear, friction mechanism to engage said band, and a winding-drum with a head carrying pinions free to travel within the friction-band, substantially as described.

2. In car-brakes, a friction-band having gear on its inside, a draw-bar, and mechanism operated by said band and connected with the said draw-bar, a shaft having a pinion to operate said friction-band, and a device to engage said friction-band and hold it from rotating, substantially as described.

3. The counter-shaft and a series of pinions operated thereby, the winding-drum turned by said pinions, the internally-geared band meshing with said pinions, and the clamping mechanism for said band, substantially as described.

4. In brake mechanism for cars, the internally-geared band and the clamping mechanism about the same, the counter-shaft and the pinions to turn said band, the winding-drum and the draw-bar, and power connections from the car-axle to the counter-shaft, substantially as described.

5. In brake mechanism for cars, a counter-shaft and positive driving mechanism connecting the shaft with the car-axle, a pinion fixed on said shaft, a band-wheel driven by said pinion and intermediate gear, a winding-drum, and friction mechanism to lock said band-wheel and cause the drum to rotate, substantially as described.

6. In a car-brake, a counter-shaft and driving-pinions, an internally-geared friction-band meshing with said pinions, a clamp to tighten on said band and stop its rotation, a winding-drum driven through said pinion, and mechanism connecting with the car-axle to drive said parts, substantially as described.

7. In car-brake mechanism, a car-axle, a counter-shaft having a fixed pinion, a friction-wheel sleeved loosely upon said shaft and having internal teeth, gears between said friction-wheel and said pinion, and a drum operated through said gears, substantially as described.

8. In a car-brake, a brake-bar, a shaft driven from the car-axle, an internally-geared band and clamps to engage the outer surface thereof, pinions operated from said shaft meshing with said geared band, and a rotating device operated by said gear and connected with the draw-bar, substantially as described.

9. The counter-shaft provided with a fixed pinion, a sleeve about said shaft, and a winding-drum about said sleeve provided at one end with a disk, pinions on said disk meshing with the pinion on the counter-shaft, an internally-geared band meshing with the pinions on the said disk, and friction-clamps about said band, substantially as described.

10. In a car-brake, a shaft connected with the car-axle by positive driving mechanism, a pinion on said shaft, and a drum and a disk rigid therewith carrying a pair of pinions meshing with said pinion, in combination with a band-gear meshing with said pair of pinions and friction-clamps engaging the outer surface of said band-gear, substantially as described.

11. In a car-brake mechanism, the car-axle, a counter-shaft, and driving mechanism connecting said axle and shaft, in combination with a friction-band having a supporting-sleeve at one side around said shaft and a bushing supporting said sleeve, a winding drum, and gear to turn said drum meshing with the said friction-band, substantially as described.

12. In a car-brake, a friction-band and clamps arranged around said band, in combination with a shaft and sliding mechanism on said shaft connected with said clamps, substantially as described.

13. In a car-brake, a rotating band having internal gear and an outside friction-surface, clamps to engage said friction-surface, a separate loose cam connected with each clamp, and a shaft with fixed cams engaging said loose cams, substantially as described.

14. In a car-brake, a pair of fixed cams on a shaft and a pair of movable cams between the fixed cams, in combination with a friction-band and clamps to engage said band having one end connected with the said movable cams, substantially as described.

15. In a car-brake, a rotating shaft carrying fixed cams and a pair of movable cams between the fixed cams, in combination with clamps held at one end by said movable cams, a friction-band engaged by said clamps, a winding-drum, a shaft supporting said drum, and gear operated by said shaft engaging said friction-band and rotating said drum, substantially as described.

16. In a car-brake, a counter-shaft driven from the car-axle and a drive-pinion fixed thereon, a band-gear and pinions between said band-gear and said drive-pinion, clamps to engage the band gear, and a shaft with cams to tighten said clamps, substantially as described.

17. In a car-brake, mechanism to set the brake, consisting of a shaft rotated by a lever, clamps operated by devices on said shaft and a friction-band having internal gear engaged on its surface by said clamps, in combination with a winding-drum, a shaft on which said drum is mounted, and pinions driven by said shaft and engaging said friction-band, substantially as described.

18. In a car-brake, a brake-bar, brake mechanism to bear against the wheels, an evener connected with said brake mechanism and said brake-bar, and a drum driven from the car-axle to move said brake-bar, substantially as described.

19. In a car-brake, a draw-bar and an evener on said draw-bar to operate the brake mechanism, in combination with a shaft having power connection with a car-axle, a winding-drum on said shaft connected to the brake-bar, and mechanism to lock said shaft and the winding-drum together, substantially as described.

20. In a car-brake, a counter-shaft driven from the car-axle and a winding-drum thereon, a brake-bar and an evener operated thereby, brake mechanism operated from said evener, and friction mechanism to engage the said winding-drum, with the shaft carrying the drum whereby the drum is turned, substantially as described.

21. In car-brake mechanism, a draw-bar, an evener pivoted, and a fixed stop on the said bar to limit the movement of the evener beyond said stop, substantially as described.

22. In car-brake mechanism, a draw-bar having fixed stops for an evener and an evener pivoted between said stops, substantially as described.

23. In car-brake mechanism, a draw-bar and an evener thereon and a connection with said evener to unite to the brake mechanism of a second car, substantially as described.

24. In car-brake mechanism, a draw-bar and an evener thereon, a horizontally-arranged evener and connections between said eveners, and connections on the horizontally-arranged evener to control the brake mechanism of another car, substantially as described.

25. In car-brake mechanism, a counter-shaft, friction mechanism sleeved loosely on said shaft, and fixed bushing supporting said friction mechanism, in combination with a stationary sleeve around said shaft and a winding-drum supported on said sleeve and operated through said friction mechanism, substantially as described.

26. In car-brake mechanism, a counter-shaft driven from the car-axle and a friction-band provided with a sleeve portion loosely surrounding the said shaft, in combination with a bushing surrounding said sleeve and forming a bearing therefor and a frame to which the bushing is rigidly fastened, substantially as described.

27. In car-brake mechanism, a friction-band and friction-clamps thereon, in combination with a shaft having separate movable pieces thereon to which the said clamps are connected and means on said shaft to move said pieces toward and from one another, substantially as described.

28. In car-brake mechanism, a shaft, a friction-band sleeved loosely on said shaft and having internal gear geared to said shaft and friction-clamps around its outside, in combination with a vertically-arranged shaft having separate movable pieces connected with said clamps, substantially as described.

29. In car-brakes, a shaft, a winding-drum on said shaft, friction mechanism about said shaft, the supporting-frame, and bushing fixed to said frame supporting the said friction mechanism, substantially as described.

Witness my hand to the foregoing specification this 22d day of August, 1891.

HENRY V. HARTZ.

Witnesses:
H. S. FISHER,
NELLIE L. McLANE.